US007584748B2

(12) United States Patent
Freese, V

(10) Patent No.: US 7,584,748 B2
(45) Date of Patent: Sep. 8, 2009

(54) EXHAUST GAS RECIRCULATION SYSTEM FOR AN INTERNAL COMBUSTION ENGINE

(75) Inventor: Charles E. Freese, V, Ira Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 23 days.

(21) Appl. No.: 11/561,503

(22) Filed: Nov. 20, 2006

(65) Prior Publication Data
US 2008/0115492 A1 May 22, 2008

(51) Int. Cl.
F02M 25/07 (2006.01)
F02B 47/08 (2006.01)
F02B 33/44 (2006.01)
F01N 5/02 (2006.01)

(52) U.S. Cl. .............................. 123/568.12; 123/195 C
(58) Field of Classification Search ............. 123/41.01, 123/568.12, 563, 568.11, 198 E, 568.13, 123/195 C; 60/605.2, 278, 279, 311, 602; 165/41, 51
See application file for complete search history.

(56) References Cited

U.S. PATENT DOCUMENTS

| 5,617,726 | A | * | 4/1997 | Sheridan et al. ............. 60/605.2 |
| 5,740,786 | A | * | 4/1998 | Gartner ...................... 60/605.2 |
| 6,192,686 | B1 | * | 2/2001 | Coleman et al. ............ 60/605.2 |
| 6,216,458 | B1 | * | 4/2001 | Alger et al. ................. 60/605.2 |
| 6,230,695 | B1 | * | 5/2001 | Coleman et al. ........ 123/568.12 |
| 6,301,887 | B1 | * | 10/2001 | Gorel et al. ................ 60/605.2 |
| 6,318,347 | B1 | * | 11/2001 | Dicke et al. .................. 123/563 |
| 6,360,732 | B1 | * | 3/2002 | Bailey et al. ............ 123/568.12 |
| 6,422,222 | B1 | * | 7/2002 | Arbeiter et al. ........... 123/568.2 |
| 6,546,919 | B2 | * | 4/2003 | Callas et al. ................. 123/563 |
| 7,210,468 | B1 | * | 5/2007 | Saele ...................... 123/568.12 |
| 7,210,469 | B1 | * | 5/2007 | Saele ...................... 123/568.12 |
| 7,322,192 | B2 | * | 1/2008 | Sheidler et al. ............ 60/605.2 |
| 7,448,368 | B2 | * | 11/2008 | Freese, V ............... 123/568.12 |
| 2002/0005190 | A1 | * | 1/2002 | Bianchi ................. 123/568.12 |
| 2002/0124553 | A1 | * | 9/2002 | Lucas et al. .................... 60/278 |
| 2007/0137619 | A1 | * | 6/2007 | Fader et al. ................. 123/435 |
| 2007/0199320 | A1 | * | 8/2007 | Yager et al. .................... 60/599 |

FOREIGN PATENT DOCUMENTS

JP           2001164942 A   *   6/2001

* cited by examiner

Primary Examiner—Hai H Huynh
(74) Attorney, Agent, or Firm—Quinn Law Group, PLLC

(57) ABSTRACT

An engine including an exhaust system operable to convey exhaust gases from the engine. A turbocharger is in fluid communication with the exhaust system. A diesel particulate filter, disposed in fluid communication with the exhaust system and located in downstream relation to the turbocharger, operates to substantially remove particulate matter from within the exhaust gases. An exhaust gas recirculation passage, disposed in downstream relation from the diesel particulate filter, operates to communicate a portion of the exhaust gases to an air-to-air heat exchanger, which operates to cool the portion of the exhaust gases. An exhaust gas recirculation valve operates to selectively and variably communicate the portion of the exhaust gases to an inlet air duct of an intake system. An engine cover defines an opening operable to communicate ambient air to the air-to-air heat exchanger to promote the cooling of the portion of the exhaust gases.

13 Claims, 1 Drawing Sheet

EXHAUST GAS RECIRCULATION SYSTEM FOR AN INTERNAL COMBUSTION ENGINE

TECHNICAL FIELD

The present invention relates to exhaust gas recirculation systems for internal combustion engines.

BACKGROUND OF THE INVENTION

Oxides of nitrogen, or NOx, is one of the components in internal combustion engine emissions. A common method for reducing NOx is through the recirculation of a fraction of engine exhaust gases back into the air inlet of the engine to be combined with the incoming air charge. This process is often called charge dilution or exhaust gas recirculation (EGR). By introducing a combination of fresh inlet air and exhaust gases into the engine, the heat absorbing capacity of the air charge is increased and the overall oxygen content of the air charge is decreased. Increasing the heat absorbing capacity of the air charge suppresses or reduces engine combustion temperature, thereby inhibiting NOx formation. Decreasing the oxygen content of the air charge decreases NOx formation by reducing the availability of one of its constituent elements.

EGR typically involves recirculation of exhaust gases through an EGR passage between an engine exhaust conduit and an engine fresh air intake passage. A valve within the EGR passage, the EGR valve, is controlled to vary a restriction within the EGR passage to regulate the flow of exhaust gases therethrough. When EGR is not required, the EGR valve is driven to a full restriction (closed) position. When EGR is required, the EGR valve is driven to an open position through application of a position control signal to the EGR valve. The degree of opening of the EGR valve varies with the magnitude of the position control signal.

Typically, the exhaust gases within the EGR passage are cooled, prior to mixing the exhaust gases with the fresh inlet air, by passing the exhaust gases through a heat exchanger. A typical heat exchanger for this application will facilitate the transfer of heat energy from the exhaust gases to a liquid cooling medium, such as the engine coolant. This type of heat exchanger is commonly referred to as an air-to-water heat exchanger.

SUMMARY OF THE INVENTION

An engine is provided having an exhaust system operable to convey exhaust gases away from the engine and an intake system operable to convey intake air to the engine. Also provided is at least one turbocharger in fluid communication with the exhaust system and operable to pressurize at least a portion of the intake system. Additionally, a diesel particulate filter operates to substantially remove particulate matter from within the exhaust gases. The diesel particulate filter is disposed in fluid communication with the exhaust system and located in downstream relation to the turbocharger. An exhaust gas recirculation passage is disposed downstream of the diesel particulate filter and operates to communicate a portion of the exhaust gases to an air-to-air heat exchanger. The air-to-air heat exchanger is operable to cool the portion of the exhaust gases. An exhaust gas recirculation valve operates to selectively and variably communicate the portion of the exhaust gases to an inlet air duct of the intake system. Additionally, an engine cover is provided, which defines an opening operable to communicate ambient air to the air-to-air heat exchanger to promote the cooling of the portion of the exhaust gases.

An auxiliary fan may be provided that operates to provide a pressure differential across the air-to-air heat exchanger, thereby drawing ambient air across the air-to-air heat exchanger. The air-to-air heat exchanger may be removably mounted with respect to the engine and may include a shroud or duct such that ambient air is directed through the air-to-air heat exchanger and onto at least a portion of the engine. The engine may be placed in a vehicle having a body structure. The body structure may contain a plurality of vents to provide a pressure differential such that the mass flow rate of ambient air across the air-to-air heat exchanger is increased.

The above features and advantages and other features and advantages of the present invention are readily apparent from the following detailed description of the best modes for carrying out the invention when taken in connection with the accompanying drawing.

DESCRIPTION OF THE PREFERRED EMBODIMENT

Figure 1:
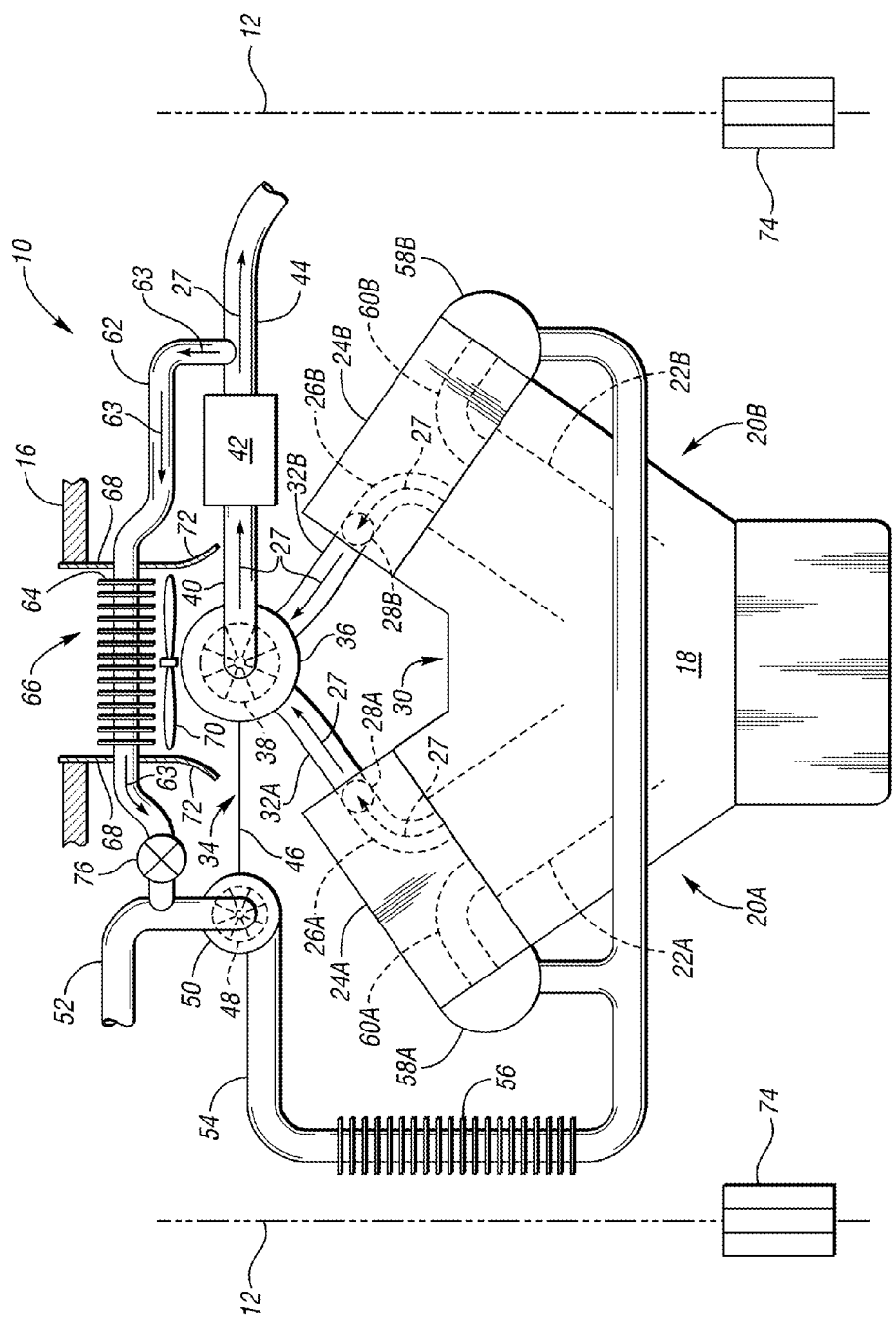
FIG. 1 is a schematic diagrammatic representation of a partial vehicle having an engine and incorporating the various aspects of the present invention.

Referring to FIG. 1, there is shown schematically a vehicle, generally indicated at 10, having a body structure 12 (shown as dashed lines), an internal combustion engine 14, and a portion of a vehicular hood member or engine cover 16. The internal combustion engine 14 may be a compression ignited or a spark ignited combustion type engine, both of which are known to those skilled in the art. For discussion herein, the internal combustion engine 14 operates in a compression ignited or diesel mode of operation. The internal combustion engine 14 has a cylinder case 18 with a generally V-type configuration. In a V-type configuration, a first and a second bank of cylinder bores 20A and 20B, respectively, of the cylinder case 18 are disposed with an included angle of less than 180 degrees relative to one another. Those skilled in the art will recognize that each of the first and second banks of cylinder bores 20A and 20B may each contain one or a plurality of cylinder bores 22A and 22B, shown in phantom. A first and second cylinder head 24A and 24B are mounted with respect to the first and second bank of cylinder bores 20A and 20B, respectively.

Each of the first and second cylinder heads 24A and 24B define respective exhaust ports 26A and 26B through which exhaust gases or products of combustion 27 are selectively evacuated from the respective cylinder bores 22A and 22B. The exhaust ports 26A and 26B communicate exhaust gases 27 to a respective one of a first and second integral exhaust manifold 28A and 28B, each defined within the first and second cylinder head 24A an 24B, respectively. The first and second integral exhaust manifolds 28A and 28B are formed integrally with the respective first and second cylinder head 24A and 24B, thereby obviating the need for fasteners and gaskets typically needed for exhaust manifold attachment. Since the integrated exhaust manifolds 28A and 28B are formed integrally with the cylinder heads 24A and 24B, respectively, the potential exhaust gas leak paths during operation of the internal combustion engine 14 are reduced.

The first and second integral exhaust manifolds 28A and 28B are positioned on the internal combustion engine 14 such that they discharge exhaust gases 27 in an inboard configuration, i.e. the first and second integral exhaust manifolds 28A and 28B are substantially adjacent to an inboard region or generally V-shaped cavity 30. The inboard discharge configuration is beneficial in that the packaging requirement of the engine 14 may be reduced. The integral exhaust manifolds 28A and 28B may discharge in any orientation within the general area defined by the generally V-shaped cavity 30 while remaining within the scope of that which is claimed. A respective first and second discharge conduit or pipe 32A and 32B are in fluid communication with the first and second integral exhaust manifolds 28A and 28B, respectively.

The internal combustion engine 14 also includes a turbocharger 34 defining a restriction and positioned within the generally V-shaped cavity 30. The turbo charger 34 includes a turbine housing 36 into which the first and second discharge pipes 32A and 32B communicate exhaust gases 27. Those skilled in the art will recognize that the first and second discharge pipes 32A and 32B may be eliminated by incorporating the first and second discharge pipes 32A and 32B into the turbine housing 36. The heat, noise, and kinetic energy of the exhaust gases 27 cause a turbine blade 38, shown in phantom, to spin or rotate within the turbine housing 36. When the useful energy is removed by the turbocharger 34, the exhaust gases 27 are communicated to a discharge pipe 40. The discharge pipe 40 communicates the exhaust gases 27 to a diesel particulate filter, or DPF 42. The DPF 42 defines a restriction, which contains a separation medium that operates to capture particulate matter, such as soot, contained within the exhaust gases 27. A DPF discharge pipe 44 communicates exhaust gases 27 to the remainder of the vehicular exhaust system, not shown. The inboard configuration of the first and second integral exhaust manifolds 28A and 28B permit the length of the first and second discharge pipes 32A and 32B to be minimized. By minimizing the length of the first and second discharge pipes 32A and 32B, the energy of the exhaust gases 27 may be retained to rotate the turbine blade 38. This heat energy would otherwise be lost to the atmosphere through heat transfer. Those skilled in the art will recognize that the present invention may incorporate a single turbocharger 34, twin turbochargers, or staged turbochargers.

The turbine blade 38 is rigidly connected, through a shaft 46, to a compressor blade 48 for unitary rotation therewith. The rotating compressor blade 48 cooperates with a compressor housing 50 to induct air at generally atmospheric pressure through an inlet air duct 52 and subsequently compress the air. The pressurized air is communicated to a compressor outlet duct 54, which is in communication with a heat exchanger 56. The heat exchanger 56 operates to transfer heat energy from the pressurized air to increase the operating efficiency of the engine 14. The heat exchanger 56 subsequently communicates the cooled pressurized air to a first and second intake manifold 58A and 58B, respectively. The first and second intake manifolds 58A and 58B distributes the air to one of a plurality of intake ports 60A and 60B defined by each of the first and second cylinder heads 24A and 24B. The intake ports 60A and 60B selectively introduce air to a respective one of the plurality of cylinder bores 22A and 22B where the air, along with a fuel charge, is subsequently combusted in a known fashion.

An exhaust gas recirculation (EGR) passage 62 is provided in downstream relation to the turbo charger 34 and DPF 42. The EGR passage 62 communicates a fraction or portion 63 of the exhaust gases 27 flowing through the DPF discharge pipe 44 to a heat exchanger 64. In the preferred embodiment of the present invention, the heat exchanger 64 is an air-to-air type. An air-to-air type of heat exchanger facilitates the transfer of heat energy from one gaseous fluid, in this case the portion 63 of the exhaust gases 27, to another relatively cooler gaseous fluid, in this case ambient air. The engine cover 16 defines a port or opening 66 operable to allow ambient air to pass through the heat exchanger 64 to cool the portion 63 of the exhaust gases 27 contained therein. A seal 68, such as an elastomeric perimeter seal, is provided to direct the ambient air into the heat exchanger 64. As the speed of the vehicle 10 increases above a threshold value, the "ram air" effect will force the ambient air though the heat exchanger 64 to effect cooling of the portion 63 of the exhaust gases 27 contained therein. However, when the vehicle 10 is operated below the threshold speed, an auxiliary fan 70 is provided to provide the necessary pressure differential to draw the ambient air though the heat exchanger. The auxiliary fan 70 is preferably electrically driven.

A fluid flow shroud or duct 72 is provided on the low pressure side of the heat exchanger and operate to direct the ambient air over engine components such as the turbocharger 34 and the first and second integral exhaust manifolds 28A and 28B to provide additional cooling of these components. A plurality of vents 74 may be mounted within the body structure 12, such as the vehicle fenders, to aid in producing a pressure differential, thereby providing an increase in the mass flow rate of ambient air passing through the heat exchanger 64. In the preferred embodiment, the heat exchanger 64 is removably mounted with respect to the engine 14. Upon exiting the heat exchanger 64, the cooled portion 63 of the exhaust gases 27 are selectively and variably introduced into the inlet air duct 52 via an EGR valve 76. The low pressure condition within the inlet air duct 52 provides a favorable condition in which to maximize the amount of cooled portion 63 of the exhaust gases 27 that may be introduced to the engine 14. Additionally, by introducing the cooled portion 63 of the exhaust gases 27 upstream of the compressor housing 50 of the turbocharger 34, an amount of mixing will occur between the cooled the portion 63 of the exhaust gases 27 and the inlet air prior to being communicated to the engine 14.

By redirecting the portion 63 of the exhaust gases 27 into the EGR passage 62 downstream of the DPF 42, filtered exhaust gases 27 are communicated to the heat exchanger 64. Therefore, the risk of fouling, corrosion, and plugging of the heat exchanger 64 is minimized.

While the internal combustion engine 10 shown in FIG. 1 includes the turbocharger 34, those skilled in the art will recognize that the turbocharger 34 may or may not be present while remaining within the inventive concept. Additionally, the intake ports 60A and 60B may be provided on either the inboard side of the cylinder heads 24A and 24B or the outboard side of the cylinder heads 24A and 24B, as shown in FIG. 1. Likewise, the exhaust ports 26A and 26B may be provided on either the inboard side of the cylinder heads 24A and 24B, as shown in FIG. 1, or the outboard side of the cylinder heads 24A and 24B.

While the best modes for carrying out the invention have been described in detail, those familiar with the art to which this invention relates will recognize various alternative designs and embodiments for practicing the invention within the scope of the appended claims.

The invention claimed is:

1. An engine defining at least one cylinder bore, the engine comprising:
   an exhaust system operable to convey exhaust gases away from the at least one cylinder bore, said exhaust system having at least one restriction therein;
   an exhaust gas recirculation passage disposed downstream of said at least one restriction and operable to communicate a portion of said exhaust gases to an air-to-air heat exchanger;

wherein said air-to-air heat exchanger is operable to cool said portion of said exhaust gases;
an exhaust gas recirculation valve operable to selectively and variably communicate said portion of said exhaust gases to an inlet air duct;
an engine cover; and
wherein said engine cover defines an opening operable to communicate ambient air to said air-to-air heat exchanger to promote the cooling of said portion of said exhaust gases.

2. The engine of claim 1, wherein said engine cover is a vehicular hood member.

3. The engine of claim 1, further comprising:
an auxiliary fan; and
wherein said auxiliary fan operates to provide a pressure differential across said air-to-air heat exchanger, thereby drawing ambient air across said air-to-air heat exchanger.

4. The engine of claim 1, wherein said at least one restriction is formed by a diesel particulate filter.

5. The vehicle of claim 1, wherein said at least one restriction is formed by a turbocharger; and
wherein said turbocharger has a compressor housing in fluid communication with said inlet air duct and a compressor outlet duct.

6. The engine of claim 1, wherein said air-to-air heat exchanger is removably mounted with respect to the engine and wherein said air-to-air heat exchanger includes a duct such that such that ambient air is directed through said air-to-air heat exchanger and onto at least a portion of the engine.

7. The engine of claim 1, wherein the engine is placed in a vehicle having a body structure; and
wherein said body structure contains a plurality of vents to provide a pressure differential such that the mass flow rate of ambient air across said air-to-air heat exchanger is increased.

8. An engine defining at least one cylinder bore, the engine comprising:
an exhaust system operable to convey exhaust gases away from the at least one cylinder bore and an intake system operable to convey intake air to the at least one cylinder bore;
at least one turbo charger in fluid communication with said exhaust system and operable to pressurize at least a portion of said intake system;
a diesel particulate filter operable to substantially remove particulate matter from within said exhaust gases, wherein said diesel particulate filter is disposed in fluid communication with said exhaust system and located downstream of said at least one turbocharger;
an exhaust gas recirculation passage disposed in downstream relation from said diesel particulate filter and operable to communicate a portion of said exhaust gases to an air-to-air heat exchanger;
wherein said air-to-air heat exchanger is operable to cool said portion of said exhaust gases;
an exhaust gas recirculation valve operable to selectively and variably communicate said portion of said exhaust gases to an inlet air duct of said intake system;
an engine cover; and
wherein said engine cover defines an opening operable to communicate ambient air to said air-to-air heat exchanger to promote the cooling of said portion of said exhaust gases.

9. The engine of claim 8, wherein said engine cover is a vehicular hood member.

10. The engine of claim 8, further comprising:
an auxiliary fan; and
wherein said auxiliary fan operates to provide a pressure differential across said air-to-air heat exchanger, thereby drawing ambient air across said air-to-air heat exchanger.

11. The engine of claim 8, wherein each of said at least one turbocharger has a compressor housing in fluid communication with said inlet air duct and a compressor outlet duct of said intake system.

12. The engine of claim 8, wherein said air-to-air heat exchanger is removably mounted with respect to the engine and wherein said air-to-air heat exchanger includes a duct such that such that ambient air is directed through said air-to-air heat exchanger and onto at least a portion of the engine.

13. The engine of claim 8, wherein the engine is placed in a vehicle having a body structure; and
wherein said body structure contains a plurality of vents to provide a pressure differential such that the mass flow rate of ambient air across said air-to-air heat exchanger is increased.

* * * * *